United States Patent [19]
Carter et al.

[11] Patent Number: 5,348,718
[45] Date of Patent: Sep. 20, 1994

[54] METHOD AND APPARATUS FOR PRODUCING CARBRIDE PRODUCTS

[75] Inventors: Michael C. Carter; Bruce W. Gerhold, both of Bartlesville, Okla.

[73] Assignee: Phillips Petroleum Company, Bartlesville, Okla.

[21] Appl. No.: 504,450

[22] Filed: Apr. 4, 1990

[51] Int. Cl.$^5$ .................. C01B 31/36; C01B 31/34; C01B 31/32

[52] U.S. Cl. .................. 423/291; 423/345; 423/346; 423/440; 423/441

[58] Field of Search .......... 423/291, 440, 441, 442, 423/345, 346; 23/208

[56] References Cited

U.S. PATENT DOCUMENTS

| | | | |
|---|---|---|---|
| 3,017,244 | 1/1962 | Atwell | 423/442 |
| 3,044,858 | 7/1962 | Sage | 423/442 |
| 3,346,338 | 10/1967 | Latham et al. | 423/440 |
| 3,848,062 | 11/1974 | Steiger et al. | 423/440 |
| 4,341,749 | 7/1982 | Iya et al. | 423/349 |
| 4,391,786 | 7/1983 | Keresting et al. | 423/442 |
| 4,752,456 | 6/1988 | Yoda et al. | 423/291 |
| 4,777,031 | 10/1988 | Senecal et al. | 423/632 |
| 4,891,339 | 1/1990 | Calcote et al. | 423/291 |

FOREIGN PATENT DOCUMENTS

| | | |
|---|---|---|
| 1214309 | 11/1986 | Canada . |
| 2403296 | 9/1977 | France . |
| 2591412 | 6/1987 | France . |

*Primary Examiner*—Gary P. Straub
*Attorney, Agent, or Firm*—Richmond, Phillips, Hitchcock & Carver

[57] ABSTRACT

A method and apparatus are provided for producing a product comprising a carbide compound, such as for example silicon carbide. A reactor is provided which has a chamber defined therein which is divided into a combustion zone and a reaction zone. A combustible mixture is injected into the combustion zone in a direction generally toward the reaction zone, and is accordingly combusted in the combustion zone. At least one reactant (i.e. silane) is injected at the boundary between the zones into the reactor chamber in a direction generally parallel to the longitudinal axis of the chamber so as to react to form raw product comprising the carbide compound.

25 Claims, 6 Drawing Sheets

METHOD AND APPARATUS FOR PRODUCING CARBRIDE PRODUCTS

BACKGROUND OF THE INVENTION

This invention relates to a method and apparatus for producing carbide products, such as silicon carbide.

Various carbide powders, such as silicon carbide, are useful as advanced ceramic materials in the fabrication of highly stressed, wear resistant ceramic parts, such as those employed in heat engines, turbo-charger rotors and heat exchangers. Although synthesis techniques such as those involving plasma and laser heating of gaseous reactants have successfully produced submicron carbide powders, it would be desirable to synthesize sinterable carbide products in a manner better suited to economical, large scale synthesis. In this regard, it is particularly advantageous to minimize the formation of deposits on walls of a carbide reactor so as to thereby minimize down-time for removing such deposits.

SUMMARY OF THE INVENTION

It is, therefore, an object of the invention to provide a method and apparatus which are economical in producing carbide products in a reactor and which minimize reactor wall deposits so as to be well suited to large scale synthesis.

The above object is realized by a method which comprises: providing a reactor having a chamber defined therein which has a longitudinal axis and longitudinally separated upstream and downstream ends, wherein the chamber comprises a combustion zone and a reaction zone such that the combustion zone longitudinally extends from the upstream end to a surface boundary between the zones and such that the reaction zone longitudinally extends from the surface boundary to the downstream end; establishing a flow of a combustible mixture in the combustion zone so as to generally flow in a direction toward the reaction zone, wherein the combustible mixture comprises a mixture of a fuel and an oxidant; combusting the combustible mixture in the combustion zone to produce hot combustion products which flow toward and into the reaction zone; injecting at least one reactant into the reactor chamber from at least one outlet of at least one reactant nozzle such that the reactant(s) exits the reactant nozzle outlet(s) at the surface boundary in a direction generally parallel to the longitudinal axis, wherein temperature conditions in at least a portion of the reaction zone are at least about 1400° C. and wherein the elemental molar ratio of carbon to oxygen for the combination of the combustible mixture and the reactant(s) is at least about 0.8:1, and further wherein the reactant(s) is capable of reacting in the reaction zone to form a carbide compound; whereby a product powder comprising the carbide compound is produced in the reaction zone.

According to another aspect of the invention, there is provided an apparatus which comprises: a reactor as described above; means for injecting a combustible mixture into the combustion zone which comprises at least one combustion nozzle having at least one outlet which communicates with the combustion zone and which is adapted to release combustible mixture into the combustion zone in a direction generally toward the reaction zone; and means for injecting at least one reactant into the reaction zone which comprises at least one reactant nozzle having at least one outlet which communicates with the chamber at the surface boundary and which is adapted to release the reactant(s) into the reactor chamber in a direction generally parallel to the longitudinal axis of the chamber, wherein the reactant(s) is capable of reacting in the chamber to form a carbide product.

According to preferred embodiments of the invention described herein, a plurality of combustion nozzle outlets define at least one linear boundary whose projection in a direction generally parallel to the longitudinal axis of the chamber and onto the above-mentioned surface boundary generally surrounds a reaction nozzle outlet. It is also preferred that the reaction nozzle have an outlet which is positioned substantially on the longitudinal axis of the chamber.

The method and apparatus of the invention are economical in requiring the use of inexpensive combustible fuels as the heating source and in requiring a minimal investment for construction of the reactor. Moreover, it has been found that injecting the reactants in a direction generally parallel to the longitudinal axis of the chamber is particularly effective at minimizing deposits on the reactor chamber walls. The preferred relative positioning of the combustion and reactant nozzles as discussed above particularly enhance this desired effect.

DETAILED DESCRIPTION OF THE INVENTION

Figure 1:
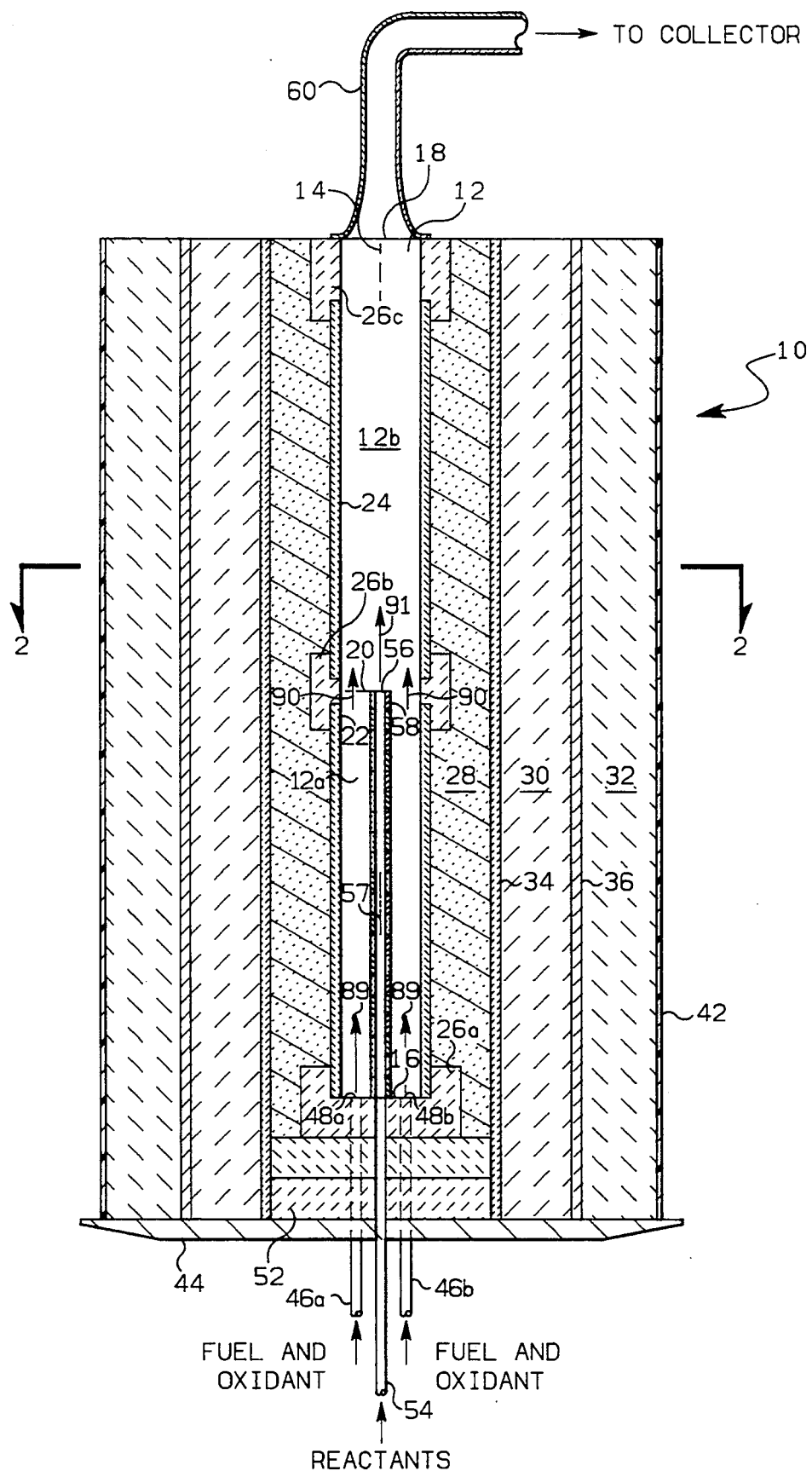
FIG. 1 is a cross-sectional view of a reactor in accordance with one embodiment of the invention.

Referring to FIG. 1, there is shown a cross-sectional view of a reactor 10 having defined therein a chamber 12 which has a longitudinal axis 14 and longitudinally separated upstream and downstream ends 16 and 18, respectively. Chamber 12 includes a combustion zone 12a and a reaction zone 12b situated such that combustion zone 12a extends from upstream end 16 to an imaginary surface, in this case planar, boundary 20 between the zones and such that the reaction zone 12b extends from boundary 20 to downstream end 18.

Chamber 12 is defined by refractory tubes 22 and 24 and also inserts 26a, b and c. Such tubes and inserts are preferably composed of a refractory material resistant to temperatures of at least 2000° C., such as zirconia, which is commercially available from Zircoa Products of Solon, Ohio.

As shown, there is provided several additional coaxially positioned layers of refractory material which are generally annular in shape and which surround tubes 22 and 24, including: layer 28, preferably comprising zirconia powder insulation, available from Zircar Products of Florida, N.Y., which allows for contraction and expansion of this layer; layer 30, which preferably comprises alumina-silica blanket insulation, commercially available under the trademark Fiberfrax ® from Carborundum of Niagara Falls, N.Y.; and layer 32, which may be of the same composition as layer 30. A refractory cyclinder 34, preferably low density thermal insulating alumina available from Zircar Products of Florida, N.Y., is illustrated as separating layers 28 and 30, and a metal cylinder 36 most preferably composed of stainless steel separates layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks it tends to stay in position if the various layers and tubes are vertically positioned. Therefore, operation can sometimes continue despite such structural defects. Other reactor orientations are within the scope of the invention, however.

Each of combustion nozzles 46a and 46b are connected to a source of fuel and oxidant and have respective outlet ends 48a and 48b which communicate with combustion zone 12a of chamber 12 at a position closely adjacent to upstream end 16 of chamber 12. As shown, nozzles 46a and 46b are surrounded by refractory inserts 52 positioned near upstream end 16. Although not shown in FIG. 1, a third combustion nozzle 46c having an associated outlet end 48c is also provided. See FIG. 2 which shows all three combustion nozzles.

A single reactant nozzle 54 is connected to a source of reactants, discussed later in detail, and extends through refractory inserts 52 and from upstream end 16 of chamber 12 to an outlet end 56 which communicates with chamber 12 at surface boundary 20. As shown, nozzle 54 has a longitudinal axis 57 which in the illustrated embodiment is parallel to longitudinal axis 14 of chamber 12. Most preferably for the purpose of optimally minimizing deposits on chamber-defining walls (hereinafter simply referred to as chamber walls) of, for example, refractory tubes 24 and 26, etc., longitudinal axis 57 corresponds to longitudinal axis 14 of chamber 12 such that said outlet 56 is positioned substantially on longitudinal axis 14. A plurality of generally annular refractory members 58, preferably composed of a suitable temperature resistant material such as zirconia-based ZYFB3 as available from Zircar Products, are preferably stacked upon one another so as to surround nozzle 54 along its length within chamber 12. Other thermal insulating layers and coatings are within the scope of the invention. Such refractory members 58 minimize heat exchange between nozzle 54 and chamber 12 so as to thereby minimize heat loss from the chamber.

Proper positioning of the nozzles with respect to each other is an important consideration in optimizing operating efficiency and quality of the product. It is desirable, for example, to position reaction nozzle outlet 56 and corresponding surface boundary 20 far enough downstream from the combustion nozzle outlets so that substantially all of the free oxygen has reacted with the fuel to form combustion products before reaching the surface boundary 20. Such positioning of the nozzles means that there is substantially no free oxygen ($O_2$ in its free gaseous state, uncombined with any other component) at surface boundary 20, thus avoiding the undesirable oxidation of one of the reactants, as will be discussed further in connection with operation of the apparatus. It is furthermore desirable to position outlet 56 sufficiently downstream to avoid the jet pump effect on gases flowing from outlet 56. This effect tends to pull the reactants upstream rather than the intended downstream flow. However, in addition to the above considerations, outlet 56 should be positioned sufficiently upstream to ensure that temperatures to which the reactants are exposed are conducive to the formation of carbide product. In regard to the above-discussed optimum positioning of reaction nozzle outlet 56, the illustrated embodiment enables particularly convenient adjustment of the position of outlet 56 by simply longitudinally withdrawing or further extending nozzle 54 from or into chamber 12.

Also shown in FIG. 1 is conduit 60 which is connected at one end to reactor 10 so as to communicate with the downstream end 18 of chamber 12. Conduit 60 receives carbide product powder therethrough which then passes to a suitable collector, discussed further below. Conduit 60 in the illustrated embodiment not only functions to transport the product to the collector, but also functions as a heat exchanger. The outside of conduit 60 is exposed to a cooling means such as ambient air which allows heat transfer via both natural convection and radiation. Such heat transfer effects cooling of the product powder as it flows through conduit 60, which is highly desirable in order to prevent undesirable reactions involving, for example, oxidation of the carbide product to form unwanted oxides. In addition, such cooling of the product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferable that a non-metallic material be employed which will not add any undesirable metal contaminants to the product. If the desired product is silicon carbide for example, quartz (silicon dioxide) is preferred since molecular structures characterized by silicon-oxygen bonds are already present in the reactor product such that essentially no additional contaminants will enter the product stream. Quartz is also a particularly preferred material because of its high emissivity and excellent thermal shock resistance. However, other heat exchange materials, including metals, are within the scope of certain aspects of the invention.

The collector can be any suitable means of collecting the product powder. One suitable collector, as discussed above, comprises a cloth filter bag connected to the downstream end of conduit 60. Other suitable collectors include metal filters, electrostatic precipitators and cyclone separators. Of course, regardless of what type of collector is used a pressure differential should preferably be established, by a suitable pump, across the collector to draw the product powder through conduit 60 and into the collector.

Figure 2:
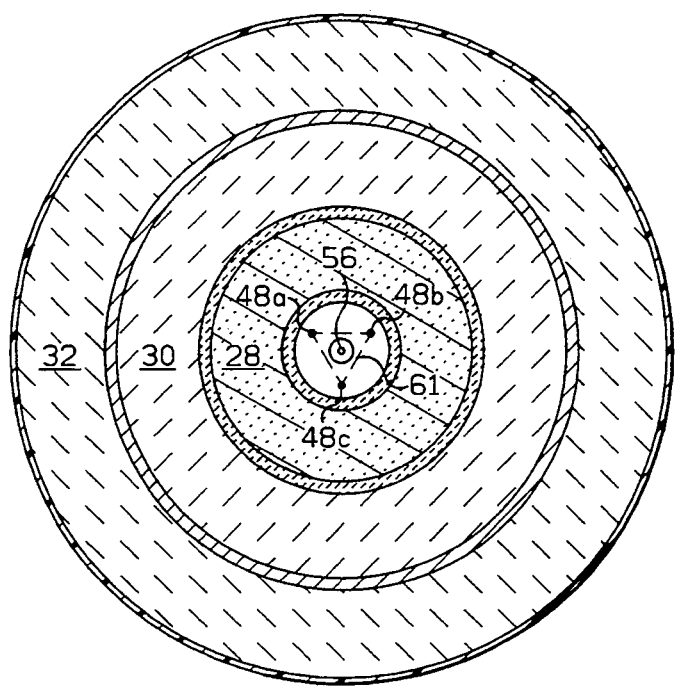
FIG. 2 is a cross-sectional view of the embodiment of FIG. 1 as viewed along line 2—2.

Referring now to FIG. 2, this view shows all three combustion nozzle outlets 48a, 48b and 48c and their relative positions with respect to reaction nozzle outlet 56. As can be seen from FIGS. 1 and 2, the combustion nozzle outlets define an imaginary linear boundary 61 whose projection in a direction generally parallel to longitudinal axis 14 of chamber 12 and onto surface boundary 20 generally surrounds outlet 56. In operation this feature advantageously provides a sheath of combustion products around reactants injected from outlet 56 so as to assist in protecting the chamber walls from deposit-forming reactions involving the reactants. As used herein and in the appended claims, the term "linear boundary" is broadly construed to include any boundary defined by a moving point, and is not limited to one or more straight line segments. In the particular embodiment illustrated, boundary 61 is generally triangular in shape and is positioned with respect to outlet 56 such that outlet 56 is generally centrally located within the above-mentioned projection of boundary 61. Most preferably, and as shown, the combustion nozzle outlets are equidistantly spaced from one another.

Figure 3:
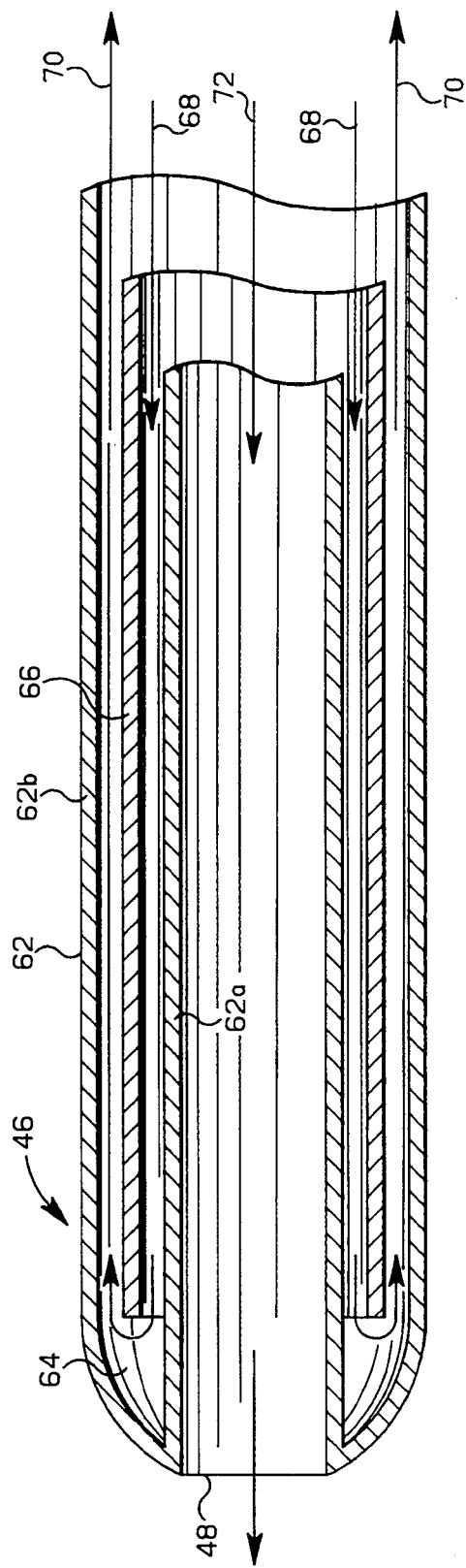
FIGS. 3 and 4 are enlarged cross-sectional views of nozzles which are shown in FIG. 1.

Referring to FIG. 3, there is shown a cross-sectional view of a portion of a nozzle labeled as 46, which represents any one of the combustion nozzles 46a, 46b and 46c which are each identical in structure and operation. Nozzle 46 comprises a tubular member 62, preferably constructed of a metal such as stainless steel, which has an inner sidewall 62a and an outer sidewall 62b. Such sidewalls define a generally annular space 64 therebetween which is connected to a source of coolant fluid such as water or ethylene glycol or a combination thereof, which could also include minor amounts of additives such as corrosion inhibitors, etc. if desired. A tubular member 66 is positioned within annular space 64 so as to generally divide the space into entrance and exit passageways for the coolant fluid. As shown, coolant fluid flows toward the tip of nozzle 46 as indicated at 68, and flows away from the tip in the opposite direction as indicated at 70. The direction of coolant fluid flow may be reversed if desired. The flow of coolant fluid through space 64 assists in preventing melting of the metallic tubular members, and also assists in preventing the flame from burning back (flashback) into nozzle 46 by keeping the interior of nozzle 46 below the autoignition temperature of the fuel/oxidant mixture. The interior of nozzle 46 is connected to a source of fuel and oxidant such that a flow of the fuel/oxidant mixture is established through nozzle 46 as indicated at 72.

Figure 4:
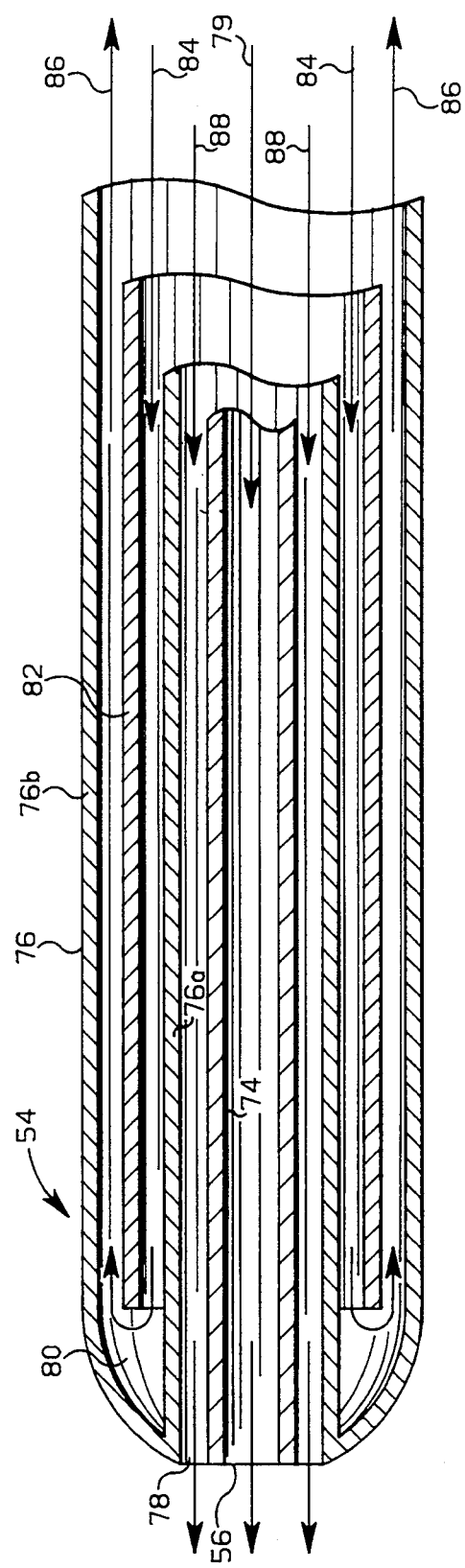

Referring to FIG. 4, there is shown a cross-sectional view of nozzle 54 having outlet end 56. Nozzle 54 is preferably constructed of the same or similar metallic material as that used for nozzle 46, and includes tubular members 74 and 76. As shown, tubular member 74 is positioned generally coaxially within tubular member 76 such that a generally annular space 78 is defined between the interior surface of member 76 and the exterior surface of member 74. The interior of tubular member 74 is connected to a source of reactants to provide a flow of reactants therethrough as indicated at 79. Tubular member 76 is generally of the same design as member 62 in FIG. 2, and includes respective inner and outer sidewalls 76a and 76b between which there is defined a generally annular space 80. A tubular member 82 is positioned within annular space 80 so as to divide it into entrance and exit passageways. Space 80 is connected to a source of coolant fluid so as to establish respective entrance and exit flow paths 84 and 86. The reverse direction of coolant fluid flow can be employed if desired. The flow of coolant fluid not only assists in preventing melting of the metallic tubular members, but also helps prevent the formation of carbide deposits within nozzle 54 by maintaining the temperature of the nozzle below temperature limits conducive to carbide formation. This avoids the need to periodically clean carbide deposits from nozzle surfaces.

Annular space 78 is connected to a purge gas source to establish a flow of such purge gas through annular space 78 in the direction of outlet end 56, as indicated at 88. Thus, this flow of purge gas exits outlet end 56 in a generally annular stream so as to surround the reactants as they exit the nozzle. This annular gas stream forms a sheath around the reactants so as to prevent contact of the hot combustion gases in chamber 12 (see FIG. 1) with the reactants immediately after their exit from nozzle 54, thereby preventing the formation of carbide deposits on the tip of nozzle 54. Such deposits, if not prevented, can eventually lead to blockage of reactant flow from nozzle 54 and consequent reactor shutdown. Of course, the insulative sheath of purge gas disperses after only a few milliseconds, but this is sufficient time to allow the reactants to flow far enough away from the nozzle tip to prevent formation of undesirable deposits. The choice of purge gas is not critical, and can be, for example, an inert gas (i.e. helium or argon), a cooled waste gas as discharged from the reactor, or a reactive carbon-containing gas (i.e. hydrocarbon) which can contribute carbon to the reactive stream for formation of carbides. If a carbon-containing hydrocarbon is used as the purge gas, it typically will not decompose quickly enough to result in any undesirable carbon deposits on the tip of nozzle 54.

The various gas flows are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor from traveling upstream, so that whatever happens downstream near the reactor will not affect the desired flow rate of gas. A pressure regulator can be employed to control the rate of flow of the gas.

Turning now to another aspect of the invention, there is provided a method of making a carbide compound using the above described apparatus. Reference will be made to the drawings in describing a preferred embodiment of this method.

As used herein and in the appended claims, a carbide compound is defined as a compound of a first elemental component and a second, carbon component. Generally speaking, a carbide compound is produced in accordance with the illustrated embodiment by reacting two reactants. The first reactant contains the first component whereas the second reactant contains the second, carbon component.

According to certain broad aspects of the invention, the first component as contained in the first reactant may be any element capable of combining with carbon to form a carbide compound. For example, the first component may be a metal such as tungsten, chromium, titanium, zirconium, molybdenum or iron. Halides of such metals are particularly suitable as the first reactant. Or, the first component may be a metalloid such as boron or silicon. As stated previously, silicon carbide is a very useful carbide compound. Ceramic parts can be made from silicon carbide powder which have excellent mechanical strength and heat resistance. Therefore, reactants having silicon as the first component are of particular interest in connection with the present invention.

Preferred silicon-containing reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be the same or different. For example, any one of A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3)SiH_3$), dimethylsilane (($CH_3)_2SiH_2$), trimethylsilane (($CH_3)_3SiH$) and tetramethylsilane ($Si(CH_3)_4$); halogenated silanes such as dichlorosilane ($H_2SiCl_2$); halogenated methylsilanes such as trimethyl silicon bromide (($CH_3)_3SiBr$) and dichlorodimethylsilane (($CH_3)_2SiCl_2$); siloxanes such as hexamethyldisiloxane (($CH_3)_3SiOSi(CH_3)_3$); silazanes such as hexamethyldisilazane (($CH_3)_3SiNHSi(CH_3)_3$); and silicon halides such as silicon tetrachloride ($SiCl_4$). Cyclic and polymeric silicon compounds are also within the scope of the invention. If desired, mixtures of any of the preceding silicon-containing compounds can be employed. Silane is the presently preferred silicon-containing reactant in view of the quality of the product.

The second, carbon-containing reactant is preferably a $C_1$-$C_9$ carbon compound such as an alcohol or a hydrocarbon. Suitable alcohols include ethanol and propanol. A hydrocarbon is presently most preferred and can be selected, by way of example, from the following group: methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof. Although such $C_1$-$C_9$ carbon compounds are preferred, any carbon-containing reactant capable of reacting with the first reactant to form carbide products is within the scope of certain aspects of the invention.

The fuel, which is injected through each of nozzles 46a, 46b and 46c, is preferably an unsaturated hydrocarbon (having at least one double or triple bond between carbon atoms), such as, for example, ethylene, propylene, butene, propadiene, butadiene, acetylene, propyne, butyne and mixtures thereof, and can be the same as or different than the hydrocarbon second reactant. A particularly preferred unsaturated hydrocarbon fuel is a mixture of ethylene and acetylene. Employing acetylene in the fuel has been found to increase the temperature in the reaction zone, discussed further below, as compared to ethylene alone, for example, which is desirable to minimize the oxygen content in the product powder and which is further desirable where a reactant such as dichlorodimethylsilane is used which requires a higher temperature than some other reactants to achieve a desirable reaction rate. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention as long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

In accordance with a preferred procedure for operating the illustrated apparatus, flow of coolant fluid is started with respect to nozzles 46a–c and 54, followed by gradual heating of the reactor to normal operating temperatures. This is done to avoid thermal shock and possible breakage to the various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzles 46a–c. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzles 46a–c so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually ½ hour to 1 hour. Operation of the reactor with air as the oxidant is part of the preliminary start-up of the reactor to gradually heat the reactor.

A flow of pure oxygen is now commenced through nozzles 46a–c to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter nozzles 46a–c and cause a potentially dangerous condition. Flashback can be prevented by providing a sufficiently high velocity of fuel and oxygen exiting each of nozzles 46a–c.

A flow of the fuel/oxygen mixture is thus established in a direction generally parallel to axis 14 as indicated at 89, and the fuel and oxygen flow rates are set to be relatively fuel-rich in preparation for carbide production. The elemental molar ratio of carbon to oxygen for the fuel/oxygen mixture is preferably at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20. As discussed previously, this is desirable to avoid the production of unwanted oxides rather than carbides. Temperature conditions in combustion zone 12a are typically about 1700° C. to about 2000° C. Hot combustion products produced in combustion zone 12a flow toward and into the reaction zone 12b as indicated at 90.

The substantially gaseous reactants are now injected into chamber 12 from reaction nozzle outlet 56, as indicated at 91, such that the reactants exit outlet 56 at boundary 20 in a direction generally parallel to the chamber axis 14, preferably generally along chamber axis 14 and toward downstream end 18. Such injection of reactants generally parallel to chamber axis 14 is particularly desirable in minimizing deposits on the chamber walls. In the illustrated embodiment, the first and second reactants are premixed to give a desired molar ratio of first component to carbon in the reactants, typically about 1:2 to about 1:4 where silicon is the first component. Such a mixture is passed through nozzle 54 so as to exit outlet end 56 into chamber 12. If the first reactant employed is normally a liquid, such first reactant is placed in vapor form most conveniently by placing it in a temperature controlled bubbler and passing a purge gas therethrough. The temperature of the coolant fluid flowing through nozzle 54 can be elevated to the necessary extent to help prevent condensation of the first reactant as it passes through nozzle 54.

Flow rates are adjusted so that the elemental molar ratio of carbon to oxygen for the combination of the reactants and fuel/oxygen mixture is at least about 0.8:1, but is preferably in the range of about 0.9:1 to about 1.5:1 and most preferably in the range of about 1:1 to about 1.3:1. Although the reactions occurring in reaction zone 12b are numerous and not completely understood, it is believed that the above cited carbon to oxygen ratios minimize the production of undesirable oxidizing species such as carbon dioxide and water, and produce partial pressures of reducing gases like carbon monoxide and hydrogen which are favorable to the production of carbides. The preferred carbon to oxygen ratios for the fuel/oxygen mixture previously discussed (preferably at least about 0.7:1, more preferably about 0.8:1 to about 1.2:1, and most preferably about 0.9:1 to about 1.1:1) particularly enhance these conditions favorable to the production of carbides. In addition, reactor temperature is somewhat dependent on the carbon to oxygen ratio, and temperatures conducive to carbide formation are achievable using the above-discussed carbon to oxygen ratios.

It is generally preferred to employ a mass ratio of no more than about 0.3. As used herein and in the appended claims, the term "mass ratio" is defined as the ratio of the synthesis rate (i.e. g/min) to the total mass flow rate (i.e. g/min) of the fuel plus oxidant into combustion zone 12a. The term "synthesis rate" (i.e. g/min) is defined as $(m \times f)/n$, where m represents the molecular weight (i.e. g/gmole) of the carbide compound, f represents the total molar flow rate (i.e. gmoles/min) of first component atoms into reaction zone 12b, and n represents the number of first component (i.e. silicon) atoms in the carbide compound. The synthesis rate is a theoretical value which is proportional to the flow rate of the first reactant and which assumes 100% reaction of the first component atoms to form the carbide compound. Of course, in actual practice, such 100% conversion does not occur and some losses occur due to deposit formation on the walls of chamber 12, walls of conduit 60, etc.

If desired, it is within the scope of the invention to inject into chamber 12 in admixture with the reactants a boron-containing compound which will provide boron in the product collected from reaction zone 12b. Suitable boron-containing compounds include boranes, such as diborane ($B_2H_6$), other boron hydrides, and boron alkyls. Boron is particularly useful in the product insofar as it acts as a sintering aid when such product is sintered to a ceramic part.

Temperature conditions for at least a portion of reaction zone 12b are at least about 1400° C., preferably in the range of about 1400° C. to about 1700° C., most preferably in the range of about 1500° C. to about 1600° C. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platinum and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a product powder is formed from the reactants which includes the desired carbide compound and other components as is discussed further below. The product powder exits the reactor through downstream end 18 and passes into and through conduit 60 to the collector. After the desired amount of product powder is collected, the reactor is shut down by first switching to air as the oxidant and then gradually decreasing the fuel/oxidant flow rates to provide gradual cooling of the reactor. After shutdown, the reactor is typically allowed to cool for several hours before the supply of coolant fluid to the nozzles is terminated.

Figure 5:
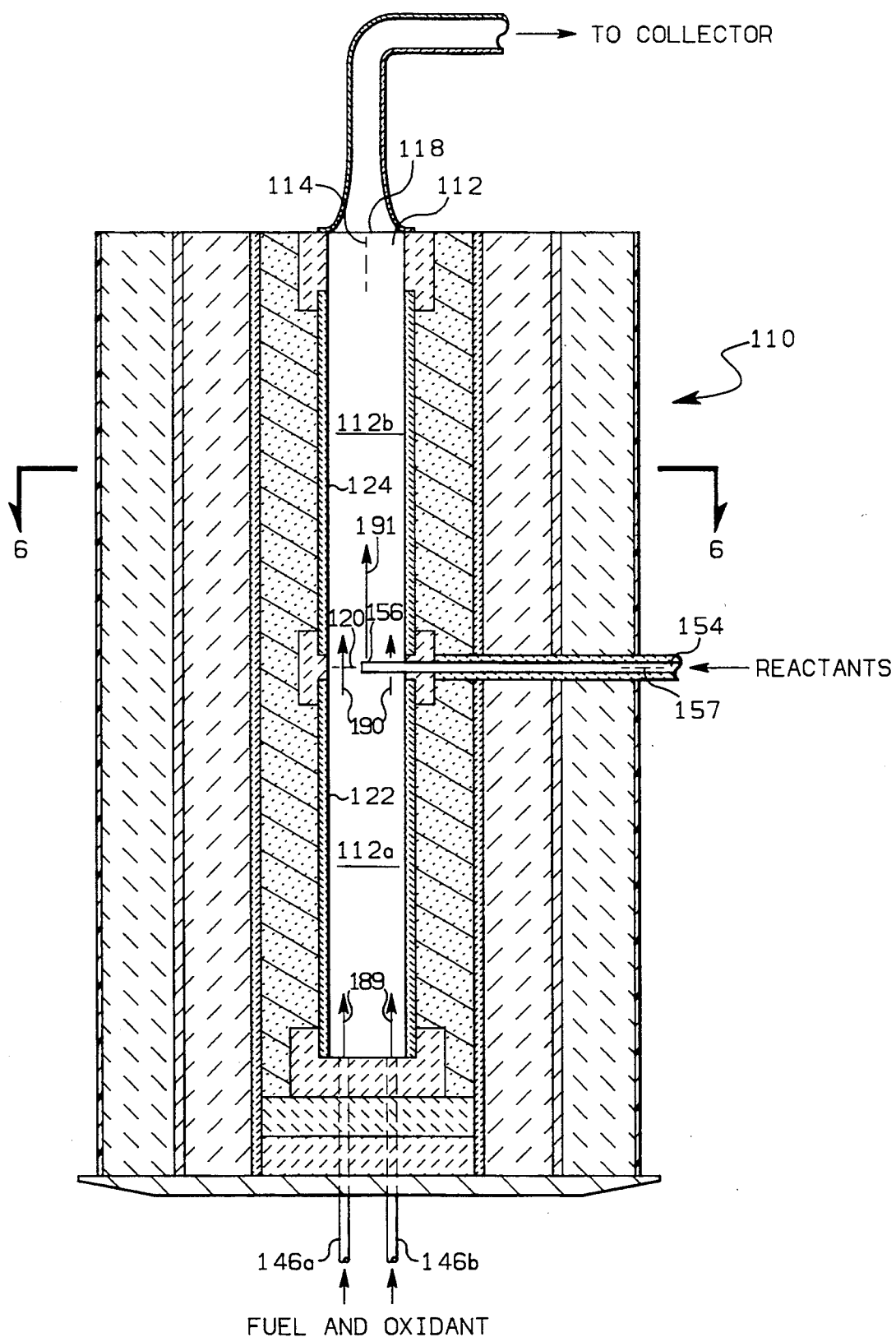
FIG. 5 is a cross-sectional view of a reactor in accordance with another embodiment of the invention.

Referring now to FIG. 5, there is shown a reactor 110 in accordance with another embodiment of the invention. The structure of the various refractory layers of reactor 110 is substantially similar to that shown in FIG. 1. The combustion nozzles, of which 146a and 146b are shown in FIG. 5, are positioned similarly to that shown in FIGS. 1 and 2 and are of the same structure as that shown in FIG. 3. This embodiment differs from the FIG. 1 embodiment with respect to the reactant nozzle 154 which is received within a refractory tube 155 so as to radially extend through the various refractory layers and into chamber 112. As shown, the longitudinal axis 157 of nozzle 154 is generally perpendicular to the longitudinal axis 114 of chamber 112. Although not visible in FIG. 5, nozzle 154 has an outlet indicated at 156 which is positioned substantially on chamber axis 114 so as to face downstream end 118 of chamber 112.

Figure 6:
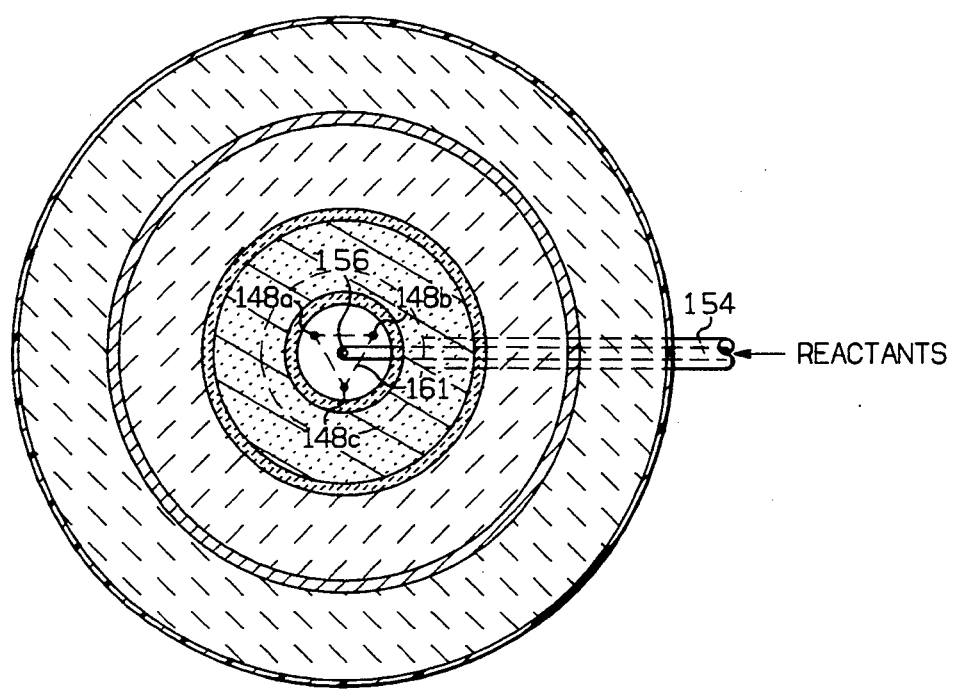
FIG. 6 is a cross-sectional view of the embodiment of FIG. 5 as viewed along line 6—6.

Referring to FIG. 6, combustion nozzle outlets 148a, 148b and 148c define a linear boundary 161 and are positioned relative to reaction nozzle outlet 156 of nozzle 154 in a manner similar to that shown in FIG. 2 with respect to combustion nozzle outlets 48a–c and reaction nozzle outlet 56.

Figure 7:
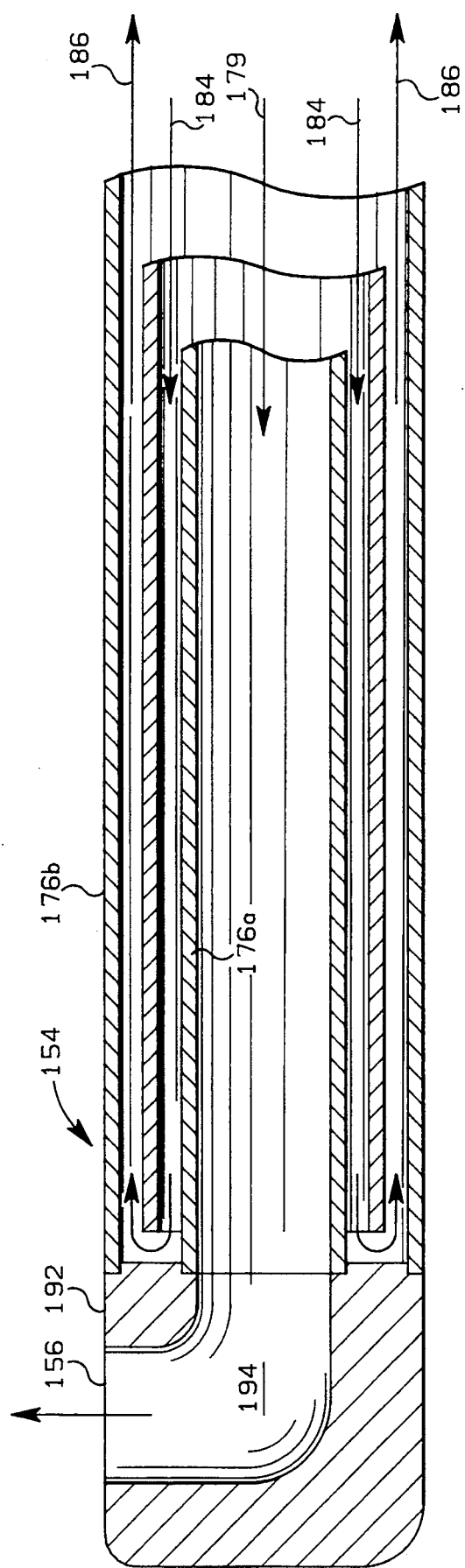
FIG. 7 is an enlarged cross-sectional view of a reactant nozzle which is shown in FIG. 5.

Referring to FIG. 7, there is shown a cross-sectional view of reaction nozzle 154. Nozzle 154 includes tubular members 176a and 176b which are oriented similarly to that of inner and outer sidewalls 76a and 76b of nozzle 54. Coolant fluid flows in the passage defined between tubular members 176a and 176b as per entry paths 184 and exit paths 186, and reactants are received through the interior of tubular member 176a as indicated at 179. Nozzle 154 further includes a tip 192 which is connected to the ends of tubular members 176a and 176b by suitable means, such as welds. An L-shaped passage 194 is defined through tip 192 so as to extend from a first end communicating with the interior of tubular member 176a to a second end which defines outlet 156. Preferably, tip 192 is composed of a metal such as nickel or copper which has a high thermal conductivity, thereby enabling quick transference of heat from tip 192 to the coolant fluid so as to avoid overheating and possible melting of the tip. It may be noted that means is not provided in nozzle 154 for providing a flow of purge gas around the reactants. This feature is omitted in this embodiment solely for the sake of simplicity of construction, and could be provided in nozzle 154 if desired.

Operation of the embodiment shown in FIGS. 5–7 is performed in a similar manner to that procedure described for the embodiment of FIGS. 1–4. A mixture of fuel and oxidant, preferably pure oxygen, is injected from the combustion nozzles into combustion zone 112a in a direction generally toward reaction zone 112b as indicated at 189. Hot combustion products produced in combustion zone 112a flow generally toward and into reaction zone 112b as indicated at 190. Although the arrows at 190 are shown as straight to indicate the general directional flow of combustion products, it should be understood that some turbulence results from flow around nozzle 154. Finally, reactants exit outlet 156 of reaction nozzle 154 at boundary 120 in a direction generally along chamber axis 114 and toward downstream end 118 as indicated at 191.

In the following description of products produced in accordance with the invention, it is to be understood that the term "weight percent" as applied to a component of a composition is based on the total weight of the composition.

The product powder as collected directly from the reactor, hereafter denoted as "raw" powder, is generally black or brown in appearance, and in the case of silicon as the first elemental component, contains silicon carbide, silicon and carbon in addition to that in the silicon carbide, and oxygen. Such a raw product powder is characterized by the following weight percentages: silicon in the amount of about 30 to about 75 weight percent, preferably in the amount of about 50 to about 70 weight percent, and most preferably in the amount of about 55 weight percent to about 70 weight percent; carbon in the amount of about 15 to about 50 weight percent, preferably in the amount of about 20 to about 45 weight percent, and most preferably in the amount of about 30 to about 40 weight percent; and oxygen in the amount of about 1 to about 30 weight percent, preferably in the amount of about 1 to about 20 weight percent, and most preferably in the amount of about 1 to about 10 weight percent. Hydrogen can also be present in the raw product in minor but detectable amounts of between about 0 and about 1 weight percent. NMR analysis is also taken to indicate that at least some of the silicon atoms in raw product powder are bonded to both carbon and oxygen atoms. In other words, at least some of the silicon in the product is simultaneously bonded to both carbon and oxygen.

The raw product powder in accordance with the invention can be further characterized insofar as a sample of such powder having a relatively high oxygen content in the range of about 3 to about 10 weight percent is sinterable to a sintered ceramic part having a density of at least about 2.8 g/cc, or about 85% of the density of pure crystalline silicon carbide, by a process comprising: pressing the raw product at a temperature of less than about 100° C. to a pressed part having a density of no more than about 1 g/cc; heating the pressed part to a temperature of about 1700° C. to about 2400° C. without application of compaction force so as to produce the sintered part having the density of at least about 2.8 g/cc; wherein no steps are performed prior to the heating step for removal of any appreciable amounts of oxygen from the raw product or pressed part produced therefrom. As used herein, the term "pressing" refers to any technique for fabricating a self-supporting shape from ceramic particles. Also as used herein, the application of a "compaction force" to a ceramic part means the application of a force to the part by means of a solid member in contact with the part which mechanically compacts the part to thereby increase its density.

With respect to particle size, the raw product powder comprises particles having diameters in the range of about 0.01 to about 0.3 micron.

The raw product powder can be further purified by additional processing to yield a purified product. This purification process typically involves two stages carried out in a conventional furnace. First, the raw powder is heated in an inert gas (i.e. argon) atmosphere at a temperature of about 1300° C. to about 2400° C., most preferably about 1400° C. to about 1800° C., for at least about 15 minutes and most preferably in the range of about 1 hour to about 2 hours. This serves to react molecular structures having silicon-oxygen bonds with carbon to thereby remove oxygen as carbon monoxide and make the silicon available for reacting with free carbon to form additional silicon carbide. In certain instances, the raw powder will have insufficient carbon to remove a substantial portion of the oxygen, thus necessitating the addition of carbon to the raw powder before heating in the inert atmosphere. Second, the powder resulting from the first purification stage is heated in an oxygen-containing atmosphere to a temperature of about 600° C. to about 900° C., most preferably about 600° C. to about 700° C., over a period of at least about 15 minutes and most preferably for about 30 minutes to about 2 hours. This stage burns off remaining carbon in the form of carbon oxides to yield the purified product.

X-ray fluorescence analysis of the purified product indicates that the product has less than about 1000 ppm of elemental impurities, wherein such elemental impurities include aluminum and those elements of higher atomic numbers, except silicon, up to and including uranium. Most preferably, the product has less than about 600 ppm of such impurities. Many impurities undesirably decrease the strength of sintered carbide parts made from product powder.

Individual particles of the purified product in the form of a powder are highly uniform and have diameters which range from about 0.05 micron to about 0.50 micron. Submicron and uniform particles are vital characteristics in the production of fine-grained, high strength parts from a carbide powder. Crystallite size (size of individual crystals) range from about 30 to about 100 angstroms.

Either the raw or purified product can be sintered into heat resistant, high strength parts in a conventional manner. For example, appropriate amounts of additives such as boron and carbon or yttrium oxide and aluminum oxide can be added to such product, followed by pressing to a desired shape and heating at a temperature of about 1700° C. to about 2400° C.

It is to be understood that the above description pertains to preferred embodiments of the invention, but that many variations and modifications are within the scope of certain aspects of the invention.

For example, although only a single reactant nozzle is provided in the illustrated embodiments, it is within the scope of certain aspects of the invention to provide a plurality of reaction nozzles having respective outlets which can, by way of example, be positioned around the longitudinal axis of the reactor chamber.

Other variations of the embodiments described above can involve different reactants and/or fuels. For example, it is possible to use excess carbon from the fuel and/or the first reactant as the source of carbon for producing the carbide compound, in which case the second, carbon-containing reactant can be omitted. It is desirable in such an embodiment to utilize a carrier gas, such as nitrogen, helium, argon, hydrogen, carbon monoxide or mixtures thereof in admixture with the first reactant to carry the first reactant into the reactor chamber. Since a mixture of carbon monoxide and hydrogen is produced as a waste gas by the reactor, the reactor can serve as a convenient source of such carrier gas. Another possible variation could involve employing a fuel which includes a preferred unsaturated hydrocarbon as well as amounts of other types of hydrocarbons such as saturated hydrocarbons. However, this will generally decrease the heat produced by the combustion reaction so as to possibly require a supplemental heat source (i.e. electric, plasma, microwave, combustion zones exterior to the reactor chamber but in heat exchange relationship with the reactor chamber, etc.) to obtain the desired temperature conditions in the reaction zone. In any event it is preferable that the hot combustion products as produced by combustion in the combustion zone provide at least about 15% of the energy needed to maintain desired temperature conditions of at least about 1400° C. in the reaction zone.

EXAMPLES

Specific examples will now be described to further illustrate the invention. These examples should not be construed to limit the invention in any manner.

In each of the following examples, various gaseous flow rates are given in gram moles/minute (abbreviated to gmol/min hereafter). Actual measurements of flow rate were taken volumetrically at room temperature and atmospheric pressure in units of liters/minute. These volumetric measurements were converted to gmol/min by assuming there are 24.45 liters/mole for any gas at 25° C. (room temperature) and at atmospheric pressure. All flow rates for gases below are undiluted with any other gases (i.e. carrier gases).

With respect to elemental analysis results given in various tables, the carbon weight percentages were obtained by means of CHNS combustion analysis, silicon percentages by X-ray fluorescence analysis, and the oxygen percentages by neutron activation analysis. In each example where an elemental analysis was performed, CHNS analysis revealed detectable amounts of hydrogen. However, such detected amounts of hydrogen were less than 1 weight percent and are not reported in the following examples. Weight percentage results which are provided have not been normalized to 100%. Variance from 100% is attributable to normal analysis inaccuracies.

Deposits on the reactor chamber walls were mentioned in several runs hereafter described. Such deposits were not measured quantitatively, but visual observations were made after the completion of various runs. These observations are given in subsequent examples in terms of "light", "medium" and "heavy" to reflect the comparability of deposits obtained for the various runs.

With respect to terminology and notations used hereafter, it will be understood that all degree readings obtained by X-ray diffraction are for an angle of $2\theta$.

EXAMPLE I

The purpose of this example is to demonstrate the formation of silicon carbide with a reactor substantially similar to that shown in FIGS. 1-4.

The reactor of this example utilized a Dacron ® filter bag to collect product powder exiting from a quartz conduit having one end in communication with the downstream end of the reactor. Important reactor dimensions are given in Table IA.

TABLE IA

| Item | Dimension |
|---|---|
| Diameter of Chamber 12 | 5.08 cm |
| Overall Length of Chamber 12 | 50.8 cm |
| Length of Combustion Zone 12a | 22.9 cm |
| Length of Reaction Zone 12b | 27.9 cm |
| Overall O.D. of Reactor 10 | 37.5 cm |
| O.D. of Tubular Member 62 | 0.953 cm |
| I.D. of Tubular Member 62 | 0.216 cm |
| O.D. of Tubular Member 74 | 0.318 cm |
| I.D. of Tubular Member 74 | 0.236 cm |
| O.D. of Tubular Member 76 | 0.953 cm |
| I.D. of Tubular Member 76 | 0.396 cm |

Using the above described apparatus, three runs were made using a mixture of ethylene and acetylene as the fuel and pure oxygen as the oxidant. Flow rates for the ethylene, acetylene and oxygen in each of the runs were 1.28 gmol/min, 0.33 gmol/min and 1.57 gmol/min, respectively, wherein gmol/min. represents gram moles/minute. Accordingly, the elemental ratio of carbon to oxygen for the combustible mixture only (combustion C:O ratio) was 1.02. Table IB summarizes other data for runs 1-3, wherein silane ($SiH_4$) and propylene ($C_3H_6$) were employed as reactants at different flow rates. Table IB also indicates the flow rate of helium (He) purge gas through the reactant nozzle, the elemental molar ratio of carbon to oxygen for the combination of the reactants and combustible mixture (overall C:O ratio), the synthesis rate, the run time, product mass collected, the mass ratio, and results of product elemental analysis.

The "product mass" collected is the mass of raw product actually collected in the filter bag at the completion of each run. The terms "synthesis rate" and "mass ratio" have been previously defined. In determining the synthesis rate, the molecular weight of silicon carbide (SiC) is assumed to be about 40 g/gmol and the molar flow rate of silicon atoms into the reaction zone is equivalent to the flow rate of $SiH_4$ indicated in Table IB. In determining mass ratio, the molar flow rates of fuel and oxygen in Table IB are converted to mass flow units of g/min.

TABLE IB

| Run No. | SiH4 gmol/min | C3H6 gmol/min | He gmol/min | Overall C:O Ratio | Syn. Rate g/min | Time mins. | Product Mass g | Mass Ratio | Product Analysis Wt. % Composition | | |
|---|---|---|---|---|---|---|---|---|---|---|---|
| | | | | | | | | | Si | C | O |
| 1 | 0.068 | 0.108 | 0.157 | 1.13 | 2.7 | 30 | 61.5 | 0.029 | 63.4 | 24.5 | 9.2 |
| 2 | 0.137 | 0.227 | 0.314 | 1.24 | 5.5 | 15 | 66.9 | 0.058 | 64.5 | 24.3 | 8.5 |
| 3 | 0.269 | 0.459 | 0.628 | 1.46 | 10.8 | 15 | 79.3 | 0.114 | 61.7 | 26.1 | 9.2 |

It can be seen from Table IB that the elemental composition is substantially unaffected by increasing the synthesis rate (at a constant flow of combustible mixture) and consequently also the mass ratio.

Powder X-ray diffraction patterns obtained for products resulting from runs 1 and 2 exhibit distinct peaks at 35°, 60° and 72°, indicating the presence of beta silicon carbide. The pattern corresponding to the product from run 3 shows a distinct peak at 35° and only a broad, poorly defined peak at about 60°, thereby indicating a decrease in crystallinity in response to an increase in synthesis rate and mass ratio.

The product from run 1 was further analyzed with respect to particle size in accordance with the following procedure. A small portion, on the order of milligrams, of the product powder was placed in a beaker containing 40 cc of a mixture of 0.07 weight percent Triton dispersant (Rohm & Haas Co., Philadelphia, Pa.) and distilled water. The resulting solution was ultrasonically treated for 10 minutes at a power level of 40 watts using a Model W-380 ultrasonic horn (Heat Systems Ultrasonics Inc., Farmingdale, N.Y.). A particle size distribution was measured using a CAPA-700 Particle Analyzer (Horiba, Tokyo, Japan). The resulting particle size distribution indicates particle diameters ranging from less than about 0.04 micron to about 0.2 micron, with the largest percentage (about 32%) of particles examined falling in the particle diameter range of 0.10 to 0.20 micron.

Deposits on the reactor chamber wall were observed after the completion of each of runs 1–3, and were found to be as follows: run 1–no deposits; run 2–light deposits on upper 3 inches of chamber wall; run 3–heavy heavy deposits on upper 5 inches of chamber wall.

EXAMPLE II

The purpose of this example is to demonstrate the production of silicon carbide using different fuels in conjunction with a reactor in accordance with the design illustrated in FIGS. 1–4.

The dimensions of the reactor of this example were substantially identical to the dimensions of the reactor described in Example I, with the exception of the combustion nozzles. Tubular member 62 of each combustion nozzle had an I.D. of 0.257 cm in run 4 and an I.D. of 0.334 in run 5.

Run 4 utilized a mixture of acetylene ($C_2H_2$) and ethylene ($C_2H_4$) whereas run 5 utilized only ethylene as a fuel. Each of these runs employed silane at a flow rate of 0.269 gmol/min, giving a synthesis rate of 10.8 g/min, and propylene at a flow rate of 0.459 gmol/min through the reactant nozzle. Further process data is summarized in Table IIA and product analysis data is set forth in Table IIB.

TABLE IIA

| Run No. | He gmol/min | C2H4 gmol/min | C2H2 gmol/min | O2 gmol/min | Comb. C:O Ratio | Overall C:O Ratio | Time mins. | Product Mass g | Mass Ratio |
|---|---|---|---|---|---|---|---|---|---|
| 4 | — | 1.87 | 0.46 | 2.21 | 1.05 | 1.36 | 7 | 58.6 | 0.080 |
| 5 | 0.628 | 3.79 | — | 3.71 | 1.02 | 1.21 | 7.5 | 55.4 | 0.048 |

TABLE IIB

| | Product Analysis Wt. % Composition | | |
|---|---|---|---|
| Run | Si | C | O |
| 4 | 64.1 | 30.9 | 6.9 |
| 5 | 61.2 | 23.4 | 16.1 |

It can be seen from the above data that the product from run 5, which used only ethylene as the fuel, had a substantially higher oxygen content than the product from run 4, which used a mixture of ethylene and acetylene. These results were obtained despite the fact that run 5 employed higher fuel and oxygen flow rates than run 4.

Powder X-ray diffraction patterns for the products from runs 4 and 5 exhibit distinct peaks at 35°, 60° and 72°, clearly indicative of the presence of beta silicon carbide.

Deposits observed at the completion of each of runs 4 and 5 were substantially similar; that is, light deposits on the upper 3 inches of the reactor chamber wall.

EXAMPLE III

This example is an additional demonstration of the production of silicon carbide using the reactor of FIGS. 1–4. This example further provides a temperature measurement in the reaction zone which was made during silicon carbide production.

Dimensions of the reactor of this example were substantially identical to those cited for the reactor of Example I, with the exception of the I.D. of tubular member 62, which was 0.257 cm.

The run of this example, hereafter denoted as run 6, employed the following process conditions: reactants silane and propylene at flow rates of 0.137 gmol/min and 0.227 gmol/min respectively; helium purge gas flow rate of 0.314 gmol/min; fuel flow rates of ethylene and acetylene of 1.56 gmol/min and 0.65 gmol/min respectively; oxygen flow rate of 2.21 gmol/min; combustion C:O ratio of 1.00; overall C:O ratio of 1.15; synthesis rate of 5.5 g/min; run time of 7 mins; product mass collected of 26 g; mass ratio of 0.042.

The reaction zone temperature was measured as 1552° C. along the reactor chamber axis and 12.7 cm upstream from the downstream end of the chamber. A thermocouple comprising bare wires of different compositions were employed to make this measurement. One wire was composed of 100% iridium whereas the other wire was composed of 60% iridium and 40% rhodium. The two wires were run through a two hole electrical insulator made of 99.8% alumina, and the insulator and wires were encased in a 0.79 cm O.D. closed end 99.8% alumina tube to protect the wires from attack by the silicon reactant. A thermocouple junction was formed by extending the wires about 0.5 cm beyond the alumina tube and spot welding the wires together. This junction was located on the longitudinal axis of the reactor chamber. Since the reactor walls are insulated and hence operate close to the same temperature as the gases in the chamber, the thermocouple readings were not corrected for radiation error.

Product analysis revealed the following weight percentages with respect to the raw product collected from run 6: 64.5 weight percent Si; 30.5 weight percent C; and 4.6 weight percent O.

The powder X-ray diffraction pattern for the raw product from run 6 revealed prominent, distinct peaks at 35°, 60° and 72°, clearly indicative of the presence of beta silicon carbide.

EXAMPLE IV

The purpose of this example is to demonstrate the sintering of a ceramic part from a purified product, wherein the purified product is derived from the raw product as produced by a reactor in accordance with the design of FIGS. 1–4.

The reactor of this example was substantially identical to the reactor of Example III.

The reactor run of this example, hereafter denoted as run 7, employed the following process conditions: fuel flow rates of ethylene and acetylene of 1.85 gmol/min and 0.45 gmol/min respectively; oxygen flow rate of 2.21 gmol/min; combustion C:O ratio of 1.04; reactant flow rates of silane and propylene of 0.137 gmol/min and 0.227 gmol/min respectively; helium purge gas flow rate of 0.314 gmol/min; overall C:O ratio of 1.19; synthesis rate of 5.5 g/min; run time of 270 mins.; product mass collected of 1633 g; and mass ratio of 0.041.

Product analysis of the collected raw product powder revealed the following weight percentages: 60.4 weight percent Si; 29.2 weight percent C; and 11.4 weight percent O. Powder X-ray diffraction analysis of the raw product revealed peaks at 35°, 60° and 72°, indicative of the presence of beta silicon carbide.

A portion of the raw product was purified, or processed, as follows. 875 grams of the raw product was mixed with 52 grams of carbon black (Black Pearls 2000, Cabot Corp.). The resulting mixture was placed in a graphite box, and the box was placed in a controlled atmosphere furnace purged with argon. The furnace was heated to 1550° C. at 25° C./min and held at 1550° C. for 2.5 hours. The resulting powder was oxidized in air at 600° C. to remove free carbon. The purified powder was subjected to elemental analysis and was found to contain 69.4 weight percent Si, 28.6 weight percent C and 1.4 weight percent O.

The purified product was sintered using boron and carbon sintering aids. 110 grams of the purified product mixed with 1.375 grams of elemental boron powder (Callery Chemical), 4.4 grams of OLOA 1200 dispersant (Chevron Chemical), 4.4 grams of stearic acid (Fisher Scientific), and 10.66 grams of phenolic resin (Durez 14000, Occidental) was milled for 24 hours in a heptane/ethanol mixture using nylon-coated steel balls. After milling, the solvent was evaporated and the dried cake was crushed and sieved (US standard sieve #40). The resulting powder was uniaxially pressed at 4000 psi into discs 4.4 cm in diameter and 0.3 cm thick. The discs were isostatically pressed at 50,000 psi to approximately 3.9 cm in diameter and 0.27 cm thick. The discs were sintered individually in a controlled atmosphere furnace employing the following sequence of steps: (1) evacuate furnace to 200 millitorr; (2) heat to 1000° C. at a rate of 65° C./minute; (3) heat to 1550° C. at a rate of 40° /minute; (4) raise furnace pressure to 300 millitorr with argon; (5) heat to 2100° C. at a rate of 40° C./minute, and hold at 2100° C. for 60 minutes; and (6) allow furnace to cool to room temperature. Twenty discs were sintered using the above procedure.

Individual densities of the twenty discs were determined and averaged to give an average density of 3.00 g/cc, or 93% of "theoretical density", the density of pure crystalline silicon carbide.

EXAMPLE V

The purpose of this example is to demonstrate the production of silicon carbide using a reactor similar to that shown in FIGS. 5–7.

Dimensions of the reactor of this example were substantially the same as those cited for the reactor of Example I, with the exception of the I.D. of tubular member 176a, which was 0.333 cm. Of course, the embodiment of the reactant nozzle of FIG. 7 does not include a tubular member analogous to tubular member 74.

Three runs were made at different synthesis rates. Run 8 used only one reactant nozzle whose outlet was positioned on the reactor chamber axis. Runs 9 and 10 used two and four reactant nozzles, respectively. Such nozzles were symmetrically spaced around the chamber axis such that their tips contacted one another. The additional reactant nozzles were needed to accommodate the increased total reactant flows. It was found that reactant flow rate through an individual reactant nozzle in accordance with the design of FIG. 7 had to be limited to a relatively low flow rate to avoid a disrupted flow pattern resulting from reactant flow through the L-shaped passage in the tip.

Flow rates for the combustible mixture in each run were as follows: ethylene at 1.26 gmol/min, acetylene at 0.32 gmol/min, oxygen at 1.57 gmol/min, and a combustion C:O ratio of 1.01.

Additional data is summarized in Table V. The reactant flow rate as given for each of runs 9 and 10 is the total flow rate from the reactant nozzles.

TABLE V

| Run No. | SiH$_4$ gmol/min | C$_3$H$_5$ gmol/min | Overall C:O Ratio | Syn. Rate g/min | Time mins. | Product Mass g | Mass Ratio | Product Analysis Wt. % Composition | | |
|---|---|---|---|---|---|---|---|---|---|---|
| | | | | | | | | Si | C | O |
| 8 | 0.137 | 0.227 | 1.22 | 5.5 | 20 | 73 | 0.059 | 65.2 | 32.0 | 3.5 |
| 9 | 0.269 | 0.459 | 1.45 | 10.8 | 10 | 82.3 | 0.115 | 68.3 | 29.7 | 2.6 |
| 10 | 0.553 | 0.928 | 1.89 | 22.1 | 5 | 90.0 | 0.236 | 65.7 | 27.7 | 5.0 |

It can be seen from Table V that the elemental composition of the product does not change dramatically with an increase in synthesis rate and mass ratio.

The powder X-ray diffraction pattern for the product from run 8 exhibits distinct peaks at 35°, 60° and 72°, indicative of the presence of beta silicon carbide. The X-ray diffraction pattern for the product from run 9 shows a distinct peak at 35°, but only broad, poorly defined peaks at 60° and 72°. The X-ray diffraction pattern for the product from run 10 shows a peak at 35°, but only a barely perceptible, broad shoulder at about 60°. This data shows in a similar manner to the data of Example I a decrease in crystallinity with increasing synthesis rate and mass ratio.

Observed deposits after the completion of each of runs 8-10 were as follows: run 8—medium deposits; run 9—medium deposits with small build-up on reactant nozzles; and run 10—heavy deposits with large build-up on reactant nozzles. In each run, observed deposits extended along the entire length of the reaction zone.

THAT WHICH IS CLAIMED IS:

1. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a surface boundary between the zones and such that the reaction zone longitudinally extends from said surface boundary to said downstream end;
establishing a flow of a combustible mixture in the combustion zone so as to generally flow in a direction generally toward the reaction zone, wherein the combustible mixture comprises a mixture of a fuel and an oxidant;
combusting the combustibel mixture in the combustion zone to produce hot combustion products which flow generally toward and into the reaction zone;
injecting at least one reactant into the chamber from at least one outlet of at least one reactant nozzle such that said at least one reactant exits said at least one reactant nozzle outlet at said surface boundary in a direction generally parallel to said longitudinal axis, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;
whereby a product powder comprising the carbide compound is produced in the reaction zone.

2. A method as recited in claim 1 wherein the flow of combustible mixture is established in the combustion zone by injecting the combustible mixture into the combustion zone from at least one outlet of at least one combustion nozzle, said at least one combustion nozzle outlet defining at least one linear boundary whose projection in a direction generally parallel to said longitudinal axis and onto said surface boundary generally surrounds said at least one reaction nozzle outlet.

3. A method as recited in claim 2 wherein said at least one reaction nozzle outlet comprises a single reaction nozzle outlet positioned substantially on said longitudinal axis such that said at least one reactant exits said at least one reactant nozzle outlet generally along said longitudinal axis and toward said downstream end.

4. A method as recited in claim 3 wherein said reaction nozzle outlet is positioned so as to be generally centrally located within said projection of said at least one linear boundary.

5. A method as recited in claim 4 wherein said at least one combustion nozzle comprises a plurality of combustion nozzles, each combustion nozzle having a corresponding outlet.

6. A method as recited in claim 5 wherein said plurality of combustion nozzle outlets are equidistantly spaced from one another.

7. A method as recited in claim 6 wherein said plurality of combustion nozzle outlets are positioned to define a generally triangular linear boundary.

8. A method as recited in claim 7 wherein said plurality of combustion nozzle outlets are positioned closely adjacent to said upstream end.

9. A method as recited in claim 1 wherein said elemental molar ratio is in the range of about 0.9:1 to about 1.5:1.

10. A method as recited in claim 9 wherein said elemental molar ratio is in the range of about 1:1 to about 1.3:1.

11. A method as recited in claim 10 wherein the elemental molar ratio for the combustible mixture is at least about 0.7:1.

12. A method as recited in claim 11 wherein the elemental molar ratio for the combustible mixture is in the range of about 0.9:1 to about 1.1:1.

13. A method as recited in claim 12 wherein said temperature conditions are in the range of about 1400° C. to about 1700° C.

14. A method as recited in claim 1 wherein the fuel comprises a hydrocarbon selected from the group consisting of ethylene, propylene, butene, propadiene, butadiene, propyne, butyne, and mixtures thereof.

15. A method as recited in claim 14 wherein the fuel comprises a mixture of ethylene and acetylene.

16. A method as recited in claim 1 wherein said at least one reactant comprises a first reactant, which includes a first component, and also a second reactant containing a second, carbon component, wherein said first and second reactants react to form said carbide compound, said carbide compound being a compound of said first component and said second, carbon component.

17. A method as recited in claim 16 wherein said first component is selected from the group consisting of silicon, boron, tungsten, chromium, titanium, zirconium, molybdenum, and iron.

18. A method as recited in claim 17 wherein said first component is silicon.

19. A method as recited in claim 18 wherein said first reactant is silane.

20. A method as recited in claim 16 wherein said second reactant comprises a $C_1$-$C_9$ carbon compound.

21. A method as recited in claim 20 wherein said $C_1$-$C_9$ carbon compound is a hydrocarbon selected from the group consisting of methane, ethane, propane, butane, pentane, hexane, heptane, octane, nonane, ethlyene, propylene, acetylene, benzene, toluene, cyclopropane, cyclobutane, cyclopentane, cyclohexane, and mixtures thereof.

22. A method as recited in claim 16 wherein a mass ratio is provided of no more than about 0.3.

23. A method as recited in claim 3 wherein said at least one reactant comprises a first reactant, which includes a first component, and also a second reactant containing a second, carbon component, wherein said first and second reactants react to form said carbide compound which is a compound of said first component and said second, carbon component, and wherein both said first and second reactants are injected into the chamber from said single reaction nozzle outlet.

24. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a surface boundary between the zones and such that the reaction zone longitudinally extends from said surface boundary to said downstream end;

establishing a flow of a combustible mixture in the combustion zone so as to flow in a direction generally toward the reaction zone, wherein the combustible mixture comprises a mixture of a fuel and an oxidant comprising oxygen:

combusting the combustible mixture in the combustion zone to produce hot combustion products which flow generally toward and into the reaction zone;

injecting at least one reactant into the chamber from at least one outlet of at least one reactant nozzle such that said at least one reactant exits said at least one reactant nozzle outlet at said surface boundary in a direction generally parallel to said longitudinal axis, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;

whereby a product powder comprising the carbide compound is produced in the reaction zone.

25. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a surface boundary between the zones and such that the reaction zone longitudinally extends from said surface boundary to said downstream end;

establishing a flow of a combustible mixture in the combustion zone so as to generally flow in a direction generally toward the reaction zone, wherein the combustible mixture comprises a mixture of a fuel and an oxidant;

combusting the combustible mixture in the combustion zone to produce hot combustion products which flow generally toward and into the reaction zone;

injecting at least one reactant into the chamber from at least one outlet of at least one reactant nozzle such that said at least one reactant is substantially gaseous as injected into said chamber and such that said at least one reactant exits said at least one reactant nozzle outlet at said surface boundary in a direction generally parallel to said longitudinal axis, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;

whereby a product powder comprising the carbide compound is produced in the reaction zone.

* * * * *